(12) United States Patent
Fukugawa et al.

(10) Patent No.: US 8,077,252 B2
(45) Date of Patent: Dec. 13, 2011

(54) ELECTRONIC CAMERA THAT ADJUSTS A DISTANCE FROM AN OPTICAL LENS TO AN IMAGING SURFACE SO AS TO SEARCH THE FOCAL POINT

(75) Inventors: Kohei Fukugawa, Osaka (JP); Kazuhiro Tsujino, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 390 days.

(21) Appl. No.: 12/197,713

(22) Filed: Aug. 25, 2008

(65) Prior Publication Data

US 2009/0059059 A1 Mar. 5, 2009

(30) Foreign Application Priority Data

Aug. 27, 2007 (JP) ................................. 2007-220357

(51) Int. Cl.
*H04N 5/232* (2006.01)
*G03B 13/00* (2006.01)
(52) U.S. Cl. .......................................... 348/354; 396/79
(58) Field of Classification Search .......... 348/345–355; 396/79, 102
See application file for complete search history.

(56) References Cited

U.S. PATENT DOCUMENTS

| | | | | |
|---|---|---|---|---|
| 4,168,890 | A * | 9/1979 | Fisher et al. | 396/101 |
| 4,967,280 | A | 10/1990 | Takuma et al. | |
| 2005/0041111 | A1 * | 2/2005 | Matsuoka | 348/207.99 |
| 2006/0182433 | A1 * | 8/2006 | Kawahara et al. | 396/123 |
| 2007/0030381 | A1 | 2/2007 | Maeda | |

FOREIGN PATENT DOCUMENTS

| | | |
|---|---|---|
| JP | 02-114774 A | 4/1990 |
| JP | 2003-092700 A | 3/2003 |
| JP | 2006-201282 A | 8/2006 |
| JP | 2006-208443 A | 8/2006 |
| JP | 2006227080 A | 8/2006 |
| JP | 2007-178543 A | 7/2007 |

OTHER PUBLICATIONS

Japanese Office Action dated Apr. 18, 2011, issued in corresponding Japanese Patent Application No. 2007-220357.

* cited by examiner

*Primary Examiner* — Nelson D. Hernández Hernández
(74) *Attorney, Agent, or Firm* — Westerman, Hattori, Daniels & Adrian, LLP (57) ABSTRACT

An electronic camera includes an image sensor having an imaging surface for capturing an object scene through a focus lens. When the object scene captured by the imaging surface includes a face portion of a human, a CPU designates, as a focal-point search area a first imaging area for covering an outline of the face portion. The CPU also designates, as a frequency-component detection area, a second imaging area that is smaller than the first imaging area and is for capturing an inner side of the outline of the face portion. Subsequently, the CPU obtains a high-frequency AF evaluation value and a mid-frequency AF evaluation value detected corresponding to the frequency-component detection area, and designates, as a lens moving range, a range different depending upon a relative ratio between the high-frequency AF evaluation value and the mid-frequency AF evaluation value. Thereafter, the CPU moves the focus lens within a designated range, and references a partial image generated on the imaging surface in a manner to correspond to the focal-point search area so as to search a focal point for the face portion.

10 Claims, 8 Drawing Sheets

ELECTRONIC CAMERA THAT ADJUSTS A DISTANCE FROM AN OPTICAL LENS TO AN IMAGING SURFACE SO AS TO SEARCH THE FOCAL POINT

CROSS REFERENCE OF RELATED APPLICATION

The disclosure of Japanese Patent Application No. 2007-220357 which was filed on Aug. 27, 2007 is incorporated herein by reference.

BACKGROUND OF THE ION

1. Field of the Invention

The present invention relates to an electronic camera. More particularly, the present invention relates to an electronic camera that changes a distance from an optical lens to an imaging surface so as to adjust a focal point to a specific object.

2. Description of the Related Art

According to one example of this type of a camera, when a face of a human is photographed, a partial area including an outline of a face region is designated as a focal-point detection area. A position of a focusing lens is so controlled that a focal-point evaluation value calculated from an image within the focal-point detection area reaches a maximum. However, in the above-described camera, a moving range of the focusing lens is not changed depending upon a focusing degree at this current point. As a result, there is a possibility that focusing control takes time.

SUMMARY OF THE INVENTION

An electronic camera according to the present invention comprises: an imager having an imaging surface for capturing an object scene through an optical lens, for repeatedly generating an object scene image; a first area designator for designating on the imaging surface, as a focal-point search area, a first imaging area for capturing a specific object so as to cover an outline of the specific object when the object scene captured by the imaging surface includes the specific object; a second area designator for designating on the imaging surface, as a frequency-component detection area, a second imaging area that is smaller than the first imaging area and is for capturing an inner side of the outline of the specific object; a detector for detecting a plurality of frequency components respectively corresponding to a plurality of frequency bands, from a partial image generated by the imager in a manner to correspond to the frequency-component detection area; a range designator for designating, as a distance change range, a range different depending upon a quantitative difference among the plurality of frequency components detected by the detector, and a searcher for searching a focal point for the specific object, by changing a distance from the optical lens to the imaging surface in the distance change range and referencing a partial image generated by the imager in a manner to correspond to the focal-point search area.

Preferably, the range designator includes a first range designator for designating, as the distance change range, a first range that may include the focal point for the specific object, when the quantitative difference exceeds a reference, and a second range designator for designating, as the distance change range, a second range that includes a current distance from the optical lens to the imaging surface and is narrower than the first range, when the quantitative difference is equal to or less than the reference.

Further preferably, there are further provided: a first distance designator for designating, as a change start distance, a longest distance within the distance change range in association with a designating process of the first range designator; and a second distance designator for designating, as the change start distance, a shortest distance within the distance change range in association with a designating process of the second range designator. The searcher starts a change process from the change start distance.

Preferably, at least one portion of the specific object is represented by a circle, and each of the first imaging area and the second imaging area is represented by a rectangle.

Preferably, there is further provided a third area designator for designating, as the focal-point search area and the frequency-component detection area, a third imaging area wider than the first imaging area, when the object scene captured by the imaging surface does not include the specific object.

Preferably, the second imaging area is an area in which a horizontal size of the first imaging area is reduced in preference to a vertical size of the first imaging area.

Preferably, the specific object is equivalent to a face portion of a human.

An imaging-control program product according to the present invention is an imaging-control program product for controlling an imaging operation of an electronic camera comprising an imager, having an imaging surface for capturing an object scene through an optical lens, for repeatedly generating an object scene image, the imaging-control program product comprises: a first area designating step of designating on the imaging surface, as a focal-point search area, a first imaging area for capturing a specific object so as to cover an outline of the specific object when the object scene captured by the imaging surface includes the specific object; a second area designating step of designating on the imaging surface, as a frequency-component detection area, a second imaging area that is smaller than the first imaging area and is for capturing an inner side of the outline of the specific object; a detecting step of detecting a plurality of frequency components respectively corresponding to a plurality of frequency bands, from a partial image generated by the imager in a manner to correspond to the frequency-component detection area; a range designating step of designating, as a distance change range, a range different depending upon a quantitative difference among the plurality of frequency components detected by the detecting step; and a searching step of searching a focal point for the specific object, by changing a distance from the optical lens to the imaging surface in the distance change range and referencing a partial image generated by the imager in a manner to correspond to the focal-point search area.

An imaging control method according to the present invention is an imaging control method of an electronic camera comprising an imager having an imaging surface for capturing an object scene through an optical lens, for repeatedly generating an object scene image, the imaging control method comprises: a first area designating step of designating on the imaging surface, as a focal-point search area, a first imaging area for capturing a specific object so as to cover an outline of the specific object when the object scene captured by the imaging surface includes the specific object; a second area designating step of designating on the imaging surface, as a frequency-component detection area, a second imaging area that is smaller than the first imaging area and is for capturing an inner side of the outline of the specific object, a detecting step of detecting a plurality of frequency components respectively corresponding to a plurality of frequency bands, from a partial image generated by the imager in a manner to correspond to the frequency-component detection area; a range designating step of designating, as a distance change range, a range different depending upon a quantitative difference among the plurality of frequency components detected by the detecting step; and a searching step of searching a focal point for the specific object, by changing a distance from the optical lens to the imaging surface in the distance change range and referencing a partial image generated by the imager in a manner to correspond to the focal-point search area.

The above described features and advantages of the present invention will become more apparent from the following detailed description of the present invention when taken in conjunction with the accompanying drawings.

DETAILED DESCRIPTION OF THE PREFERRED EMBODIMENTS

Figure 1:
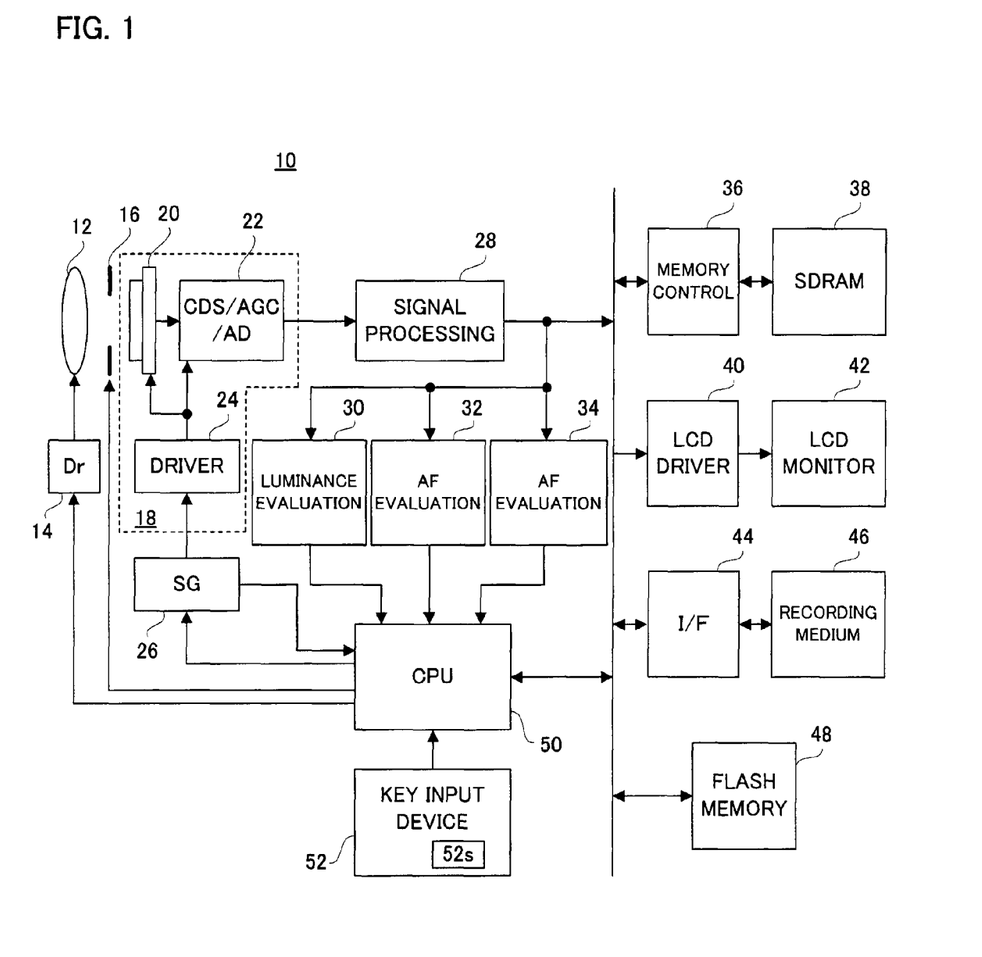
FIG. 1 is a block diagram showing a configuration of one embodiment of the present invention.

With reference to FIG. 1, a digital camera 10 according to this embodiment includes a focus lens 12 and an aperture unit 16. An optical image of an object scene through these members is irradiated onto a front surface, i.e., an imaging surface, of an imaging portion 20 configuring a CMOS-type image sensor 18, and is then photoelectrically converted. Thereby, a raw image signal formed of electric charges representing an object scene image is generated.

When a power source is turned on, a through-image process is executed. A CPU 50 instructs a driver 24 configuring the image sensor 18 to repeat a pre-exposure operation and a thin-out reading operation. The driver 24 exposes the imaging surface at each time a vertical synchronization signal Vsync is outputted from an SG (Signal Generator) 26, and reads out a part of the electric charges generated thereby from the imaging portion 20 in a raster scanning mode. The vertical synchronization signal Vsync is outputted from the SG 26 at every 1/30 seconds. As a result, a low-resolution raw image signal is outputted from the imaging portion 20 at every 1/30 seconds.

The raw image signal of each frame, outputted from the imaging portion 20, is subjected to a series of processes, such as a correlation double sampling, an automatic gain adjustment, and an A/D conversion, by a CDS/AGC/AD circuit 22 configuring the image sensor 18. A signal-processing circuit 28 applies processes, such as a white balance adjustment, a color separation and a YUV conversion, to the raw image data outputted from the CDS/AGC/AD circuit 22 and writes YUV-formatted image data to an SDRAM 38 through a memory control circuit 36.

An LCD driver 40 reads out the image data thus written to the SDRAM 38 through the memory control circuit 36 at every 1/30 seconds, and drives an LCD monitor 42 based on the read-out image data. As a result, a real-time moving image (through image) of the object scene is displayed on a monitor screen.

Figure 2:
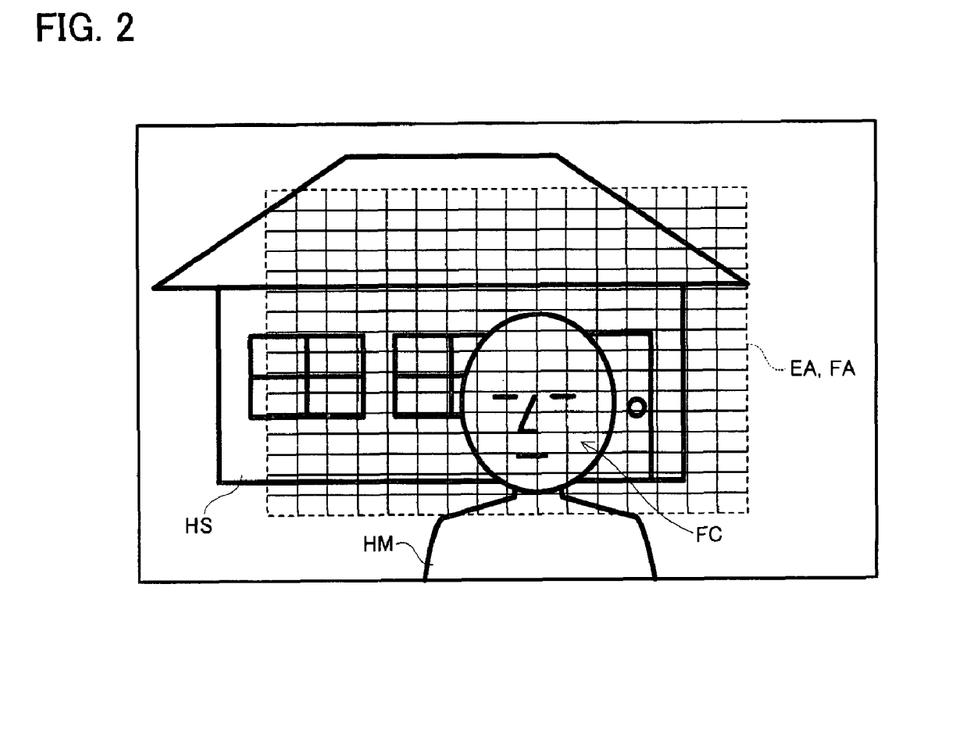
FIG. 2 is an illustrative view showing one example of an object scene captured by an image sensor of the embodiment in FIG. 1.

With reference to FIG. 2, a photometric area EA and a focus area FA are allocated at a center of the imaging surface. The photometric area EA and the focus area FA have the same size to each other and are arranged at the same position to each other. Also, both the photometric area EA and the focus area FA are divided into 16 parts in each of a vertical direction and a horizontal direction. That is, each of the photometric area FA and the focus area FA is formed of 256 evaluation areas having the same size to each other.

A luminance evaluation circuit 30 integrates Y data belonging to each evaluation area, out of the Y data outputted from the signal-processing circuit 28, at every 1/30 seconds, and then, calculates 256 luminance evaluation values (brightness information) respectively corresponding to the 256 evaluation areas at every 1/30 seconds. An AF evaluation circuit 32 integrates a high-frequency component of the Y data belonging to each evaluation are out of the Y data outputted from the signal-processing circuit 26, at every 1/30 seconds, and then calculates 256 high-frequency AF evaluation values (focusing degree information) respectively corresponding to the 256 evaluation areas, at every 1/30 seconds. An AF evaluation circuit 34 integrates a mid-frequency component of the Y data belonging to each evaluation area, out of the Y data outputted from the signal-processing circuit 26, at every 1/30 seconds, and then calculates 256 mid-frequency AF evaluation values (other focusing degree information) respectively corresponding to the 256 evaluation areas, at every 1/30 seconds.

In order to calculate an appropriate EV value based on the luminance evaluation values outputted from the luminance evaluation circuit 30, the CPU 50 repeatedly executes an AE process for the through image, in parallel with the above-described through-image process. An amount of aperture and an exposure time period, which define the calculated appropriate EV value, are respectively set to the aperture unit 16 and the driver 24. As a result, a brightness of the through image displayed on the LCD monitor 42 is moderately adjusted.

When a shutter button 52s on a key input device 52 is operated, the CPU 50 executes an AE process for recording in order to calculate an optimal EV value based on the luminance evaluation values outputted from the luminance evaluation circuit 30. An amount of aperture and an exposure time period, which define the calculated optimal EV value, are respectively set to the aperture unit 16 and the driver 24 in the same manner as described above. The CPU 50 further executes a focus adjusting process based on the high-frequency AF evaluation value and the mid-frequency AF evaluation value respectively outputted from the AF evaluation circuits 32 and 34. The focus lens 12 is moved by the driver 14 in an optical axis direction and arranged at a focal point.

Upon completion of the focus adjusting process, a recording process is executed. The CPU 50 instructs the driver 24 to execute a main exposure operation and all-pixel reading, one time each. The driver 24 applies the main exposure to the imaging surface in response to an occurrence of the vertical synchronization signal Vsync, and reads out all the electric charges generated thereby from the imaging portion 20 in a raster scanning mode. As a result, a high-resolution raw image signal representing the object scene is outputted from the imaging portion 20.

The outputted raw image signal is subjected to the same processes as that described above, and as a result, the high-resolution image data according to the YUV format is saved in the SDRAM 38. An I/F 44 reads out the high-resolution image data thus accommodated in the SDRAM 38 through the memory control circuit 36, and then, records the read-out image data on a recording medium 46 in a file format. It is noted that the through-image process is resumed when the high-resolution image data is accommodated in the SDRAM 38.

The focus adjusting process is executed by the CPU 50 according to the following procedure. First, a face recognizing process, in which the image data accommodated in the SDRAM 38 is noticed, is executed. Specifically, with reference to pattern data registered in a dictionary, such as "eye", "nose", "mouth" or the like, an attempt is made to recognize a face portion FC of a human from the object scene.

Figure 5:
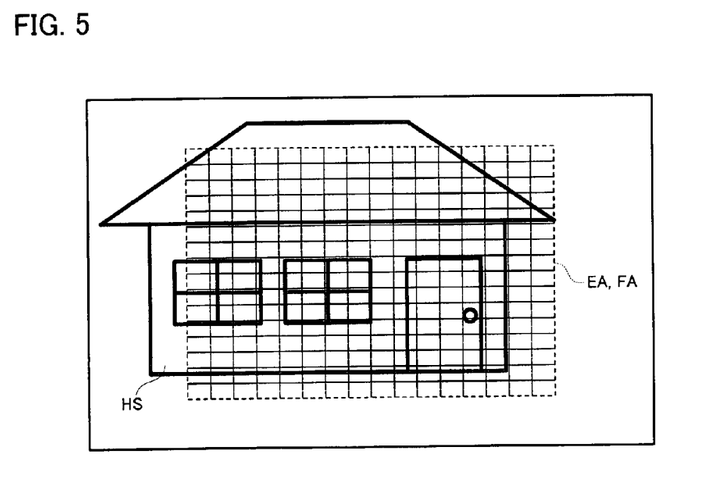
FIG. 5 is an illustrative view showing another example of an object scene captured by an image sensor of the embodiment in FIG. 1.

When an object scene including a house HS and a human HM standing in front thereof, as shown in FIG. 2, is captured, the face recognizing process is successful. In this case, a rectangular imaging area M1 for capturing the face portion FC so as to cover an outline of the face portion FC is designated as a focal-point search area, and a rectangular imaging area M2 that is smaller than the imaging area M2 and is for capturing an inner side of the outline of the face portion FC is designated as a frequency-component detection area (see FIG. 3). On the other hand, when an object scene including only the house HS, as shown in FIG. 5, is captured, the face recognizing process fails. In this case, an entire region of the focus area FA is designated as the focal-point search area and the frequency-component detection area.

Figure 3:
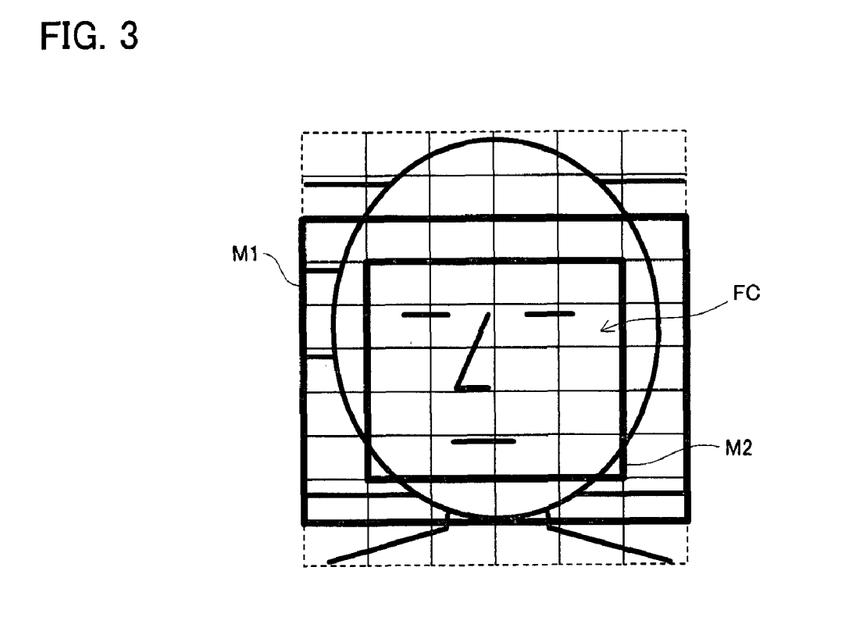
FIG. 3 is an illustrative view showing one portion of a focus adjusting operation in which a face of a human is noticed.

As seen from FIG. 3, both the imaging areas M1 and M2 are formed of some evaluation areas within the focus area FA. The imaging area M1 is formed of six evaluation areas in the horizontal direction and seven evaluation areas in the vertical direction. Furthermore, the imaging area M2 is formed of four evaluation areas in the horizontal direction and five evaluation areas in the vertical direction. The imaging area M2 is obtained by excluding the evaluation areas forming an edge or periphery of the imaging area M1. However, when the number of evaluation areas configuring the imaging area M1 is small, the process for excluding the evaluation areas is exceptionally canceled.

Upon completion of the designation of the focal-point search area and the frequency-component detection area, the high-frequency AF evaluation values and the mid-frequency AF evaluation values belonging to the frequency-component detection area are respectively obtained from the AF evaluation circuits 32 and 34, a total sun (=ΣAFh) of the obtained high-frequency AF evaluation values and a total sum (=ΣAFm) of the obtained mid-frequency AF evaluation values are calculated, and a relative ratio is calculated by a calculation according to Equation 1. The relative ratio to be calculated indicates a quantitative difference between the high-frequency component and the mid-frequency component belonging to the frequency-component detection area.

$$\text{Relative ratio} = \Sigma AFh / \Sigma AFm \qquad \text{[Equation 1]}$$

Figure 4:
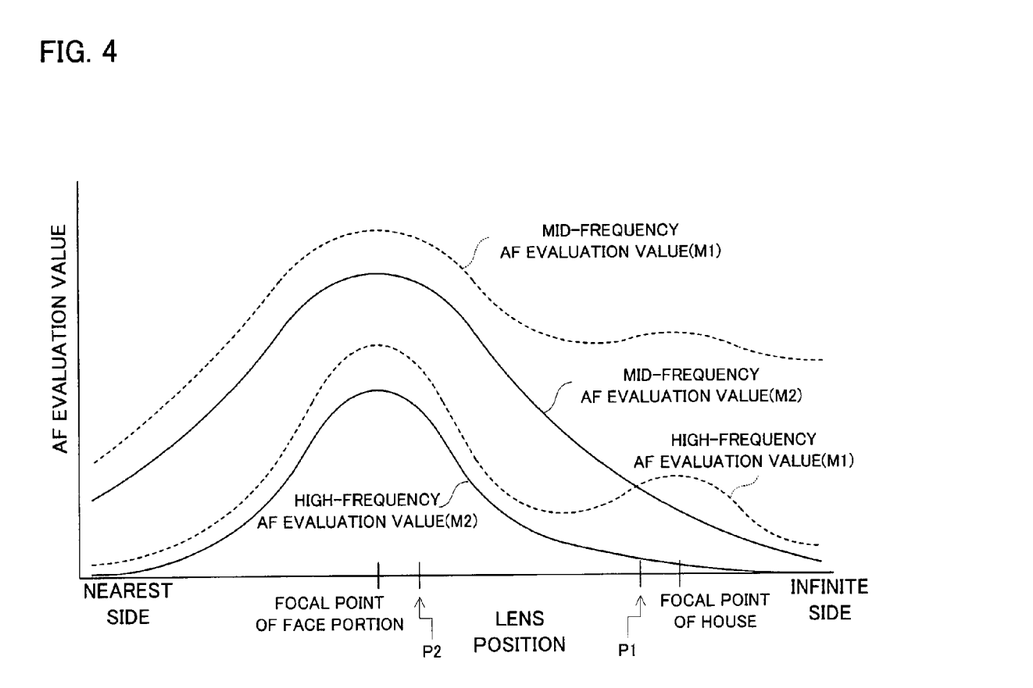
FIG. 4 is a graph showing one example of changes of a high-frequency AF evaluation value and a mid-frequency AF evaluation value with respect to a lens position.

FIG. 4 shows changes of the high-frequency AF evaluation values and the mid-frequency AF evaluation values with respect to the position of the focus lens 12 at a time that the object scene shown in FIG. 2 is captured. The high-frequency AF evaluation values and the mid-frequency AF evaluation values detected in the imaging area M1 change according to a manner shown by dotted lines. Furthermore, the high-frequency AF evaluation values and the mid-frequency AF evaluation values detected in the imaging area M2 change according to a manner shown by solid lines. A percentage in which the house HS is captured in the imaging area M1 is greater than that in which the house HS is captured in the imaging area M2. Therefore, the high-frequency AF evaluation values and the mid-frequency AF evaluation values detected in the imaging area M2 change along a convex curve only near the focal point with respect to the face portion FC. In contrast, the high-frequency AF evaluation values and the mid-frequency AF evaluation values detected in the imaging area M1 change along a convex curve also near the focal point with respect to the house HS. On the other hand, when the object scene shown in FIG. 5 is captured, the high-frequency AF evaluation values and the mid-frequency AF evaluation values to be detected corresponding to the focus area FA change according to a manner shown in FIG. 6 with respect to the position of the focus lens 12.

Figure 6:
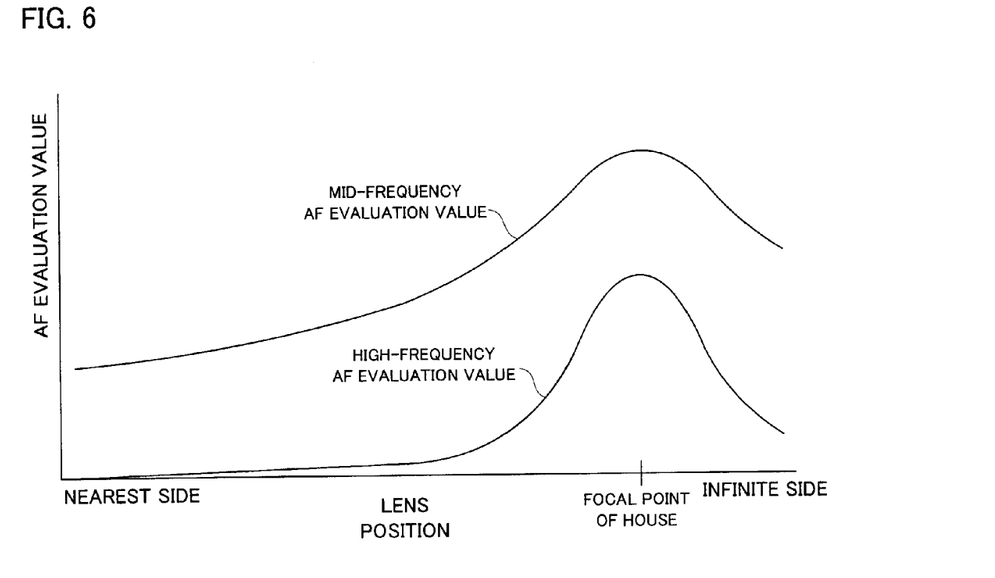
FIG. 6 is a graph showing another example of changes of the high-frequency AF evaluation value and the mid-frequency AF evaluation value with respect to the lens position.

As seen from FIG. 4 and FIG. 6, with respect to the relative ratio, the closer the focus lens 12 to the focal point, the greater the relative ratio. Therefore, the relative ratio can be regarded as a focusing degree of the focus lens 12.

When the relative ratio is less than a threshold value TH, it is regarded that the focus lens 12 is at a position apart from a focal position, and an entire region of a range over which the focus lens 12 is able to move is designated as a moving range of the focus lens 12. Furthermore, a nearest-side end portion of the designated moving range is designated as a movement start position of the focus lens 12, and an infinite direction is designated as a moving direction.

When the relative ratio is greater than the threshold value TH, it is regarded that the focus lens 12 is at a position near the focal position, and a partial range including the current lens position is designated as a moving range of the focus lens 12. Furthermore, an infinite-side end portion of the designated moving range is designated as the movement start position of the focus lens 12, and a nearest direction is designated as the moving direction.

The focus lens 12 moves from the movement start position to the designated direction, and is arranged at the focal point by a so-called hill-climbing AF process. That is, a position at which the high-frequency AF evaluation value detected in the focal-point search area reaches a maximum is specified as the focal point, and the focus lens 12 is arranged at the specified focal point. When there are a plurality of focal points, the focus lens 12 is arranged at a focal point that is specified first.

Therefore, in a case of capturing of the object scene shown in FIG. 2, when the current position of the focus lens 12 is near a focal point (for example, a position P1 shown in FIG. 4) with respect to the house HS, an entire region of a movable range of the focus lens 12 (first range) is designated as the moving range, and the focus lens 12 moves in the infinite direction from the nearest-side end portion of the designated moving range. On the other hand, in a case of capturing the object scene shown in the same FIG. 2, when the current position of the focus lens 12 is near a focal point (for example, a position P2 shown in FIG. 4) with respect to the face portion FC, a region near the current lens position (=second range) is designated as the moving range, and the focus lens 12 moves in the nearest direction from the infinite-side end portion of the designated moving range. The focal point is searched by the hill-climbing AF process, and the focus lens 12 reaches the focal point with respect to the face portion FC.

The CPU 50 executes a plurality of tasks, including an imaging control task shown in FIG. 7 to FIG. 10, in a parallel manner. It is noted control programs corresponding to these tasks are accommodated in a flash memory 48.

Figure 7:
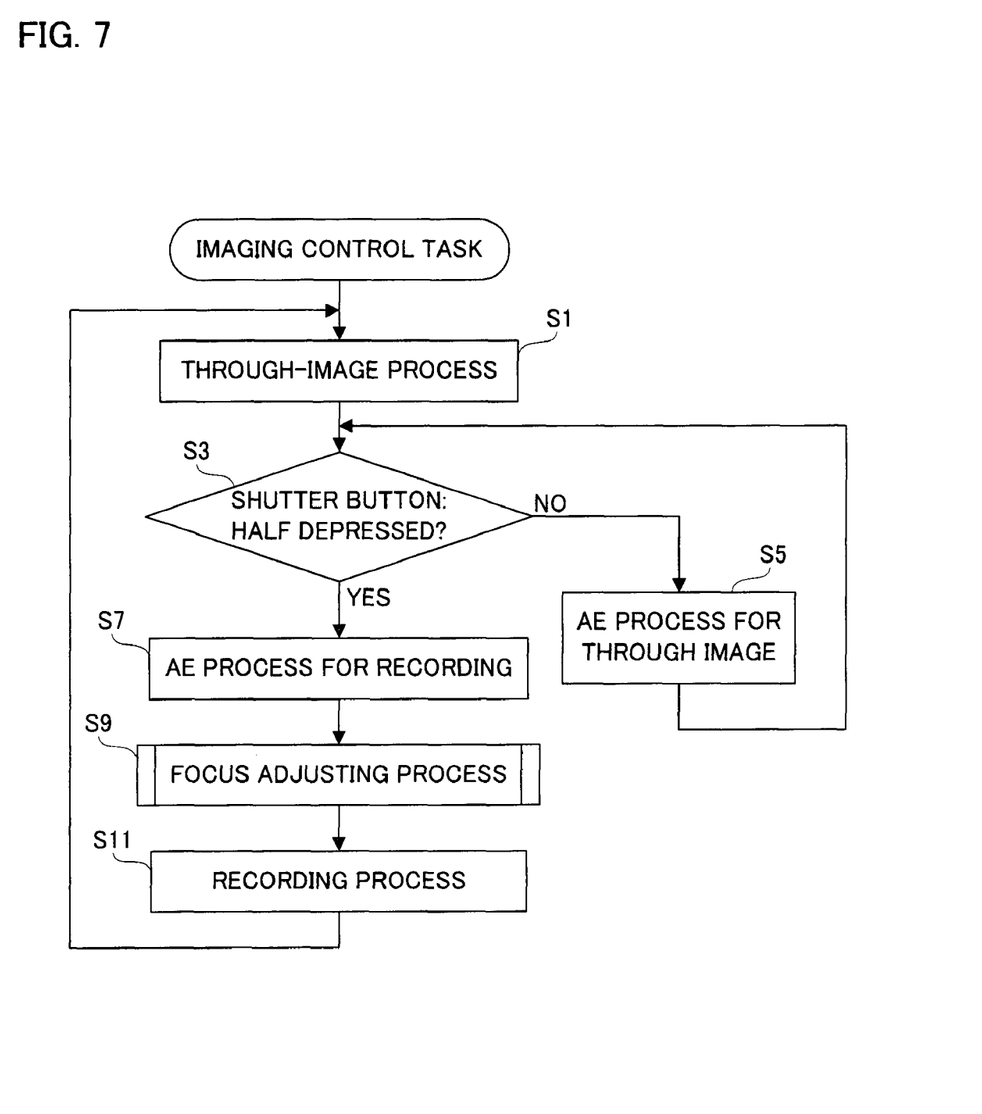
FIG. 7 is a flowchart showing one portion of an operation of a CPU applied to the embodiment in FIG. 1.

With reference to FIG. 7, the through-image process is executed in a step S1. As a result, the through image representing the object scene is outputted from the LCD monitor 42. In a step S3, it is determined whether or not the shutter button 52s is operated. As long as NO is determined, the AE process for the through image in a step S5 is repeatedly executed. As a result, the brightness of the through image displayed on the LCD monitor 42 is moderately adjusted. When the shutter button 52s is operated, the AE process for recording is executed in a step S7, the focus adjusting process is executed in a step S9, and the recording process is executed in a step S11.

As a result of the process in the step S7, the amount of aperture and the exposure time period, which define the optimal EV value, are set to the aperture unit 16 and the driver 24, respectively. Furthermore, as a result of the process in the step S9, the focus lens 12 is arranged at the focal point. Furthermore, as a result of the process in the step S11, the high-resolution image data representing an object scene immediately after the focus lens 12 is arranged at the focal point is recorded on the recording medium 46.

Figure 8:
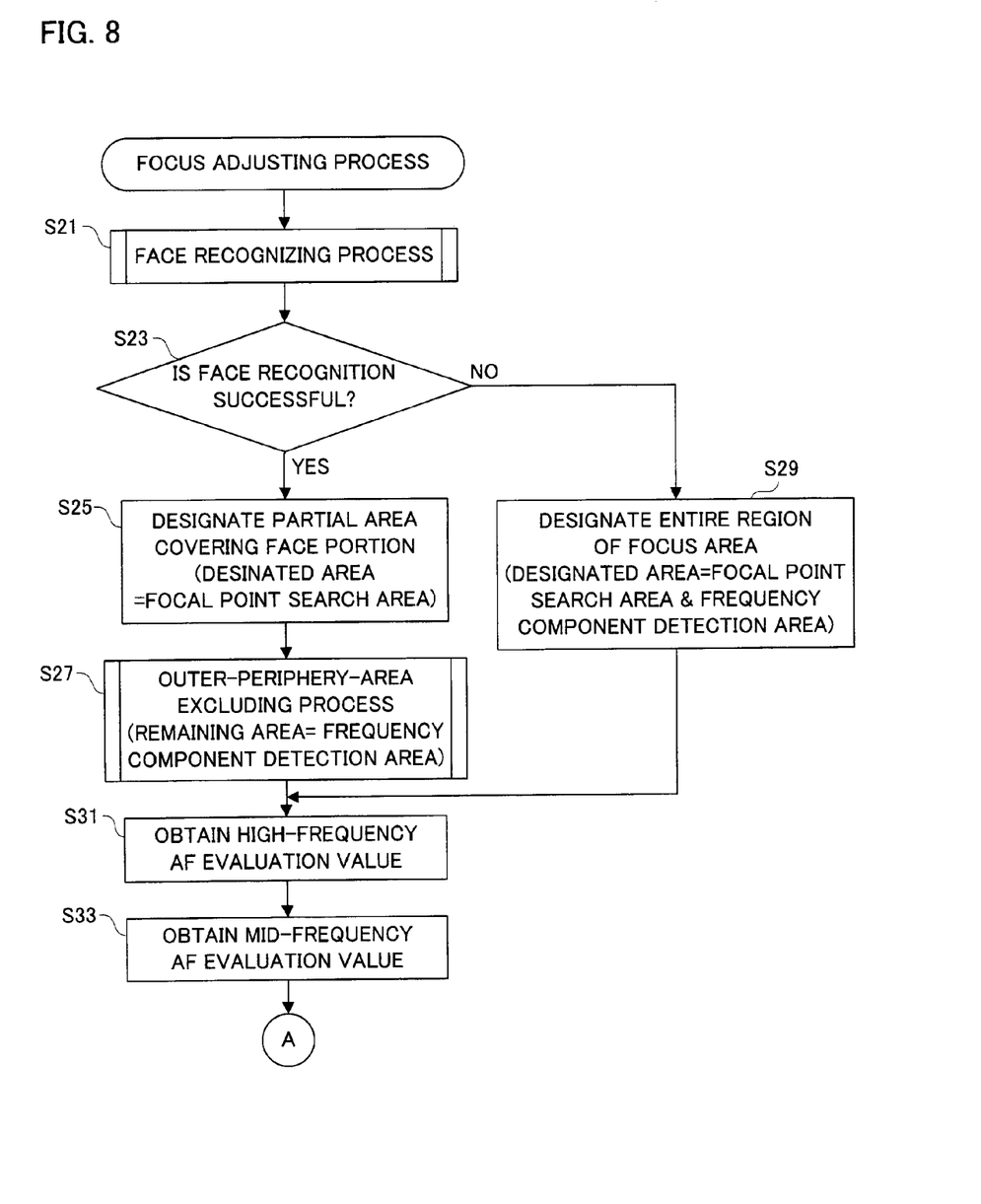
FIG. 8 is a flowchart showing another portion of the operation of the CPU applied to the embodiment in FIG. 1.
Figure 9:
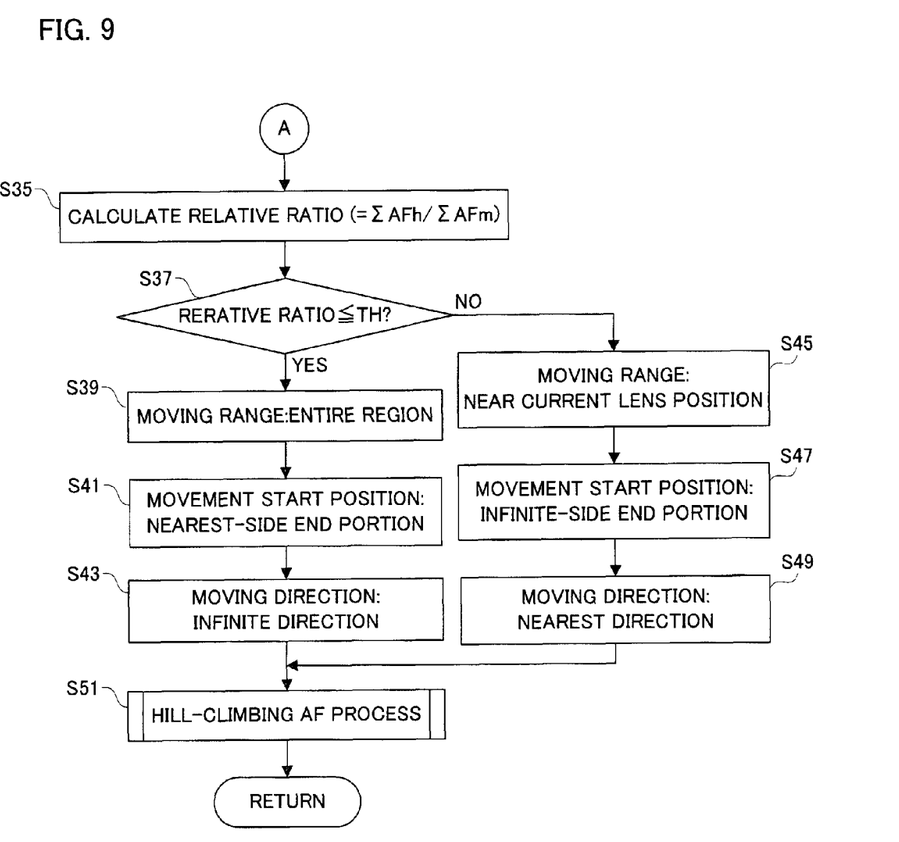
FIG. 9 is a flowchart showing still another portion of the operation of the CPU applied to the embodiment in FIG. 1.

The focus adjusting process in the step S9 is executed according to a subroutine shown in FIG. 8 and FIG. 9. First, the face recognizing process is executed in a step S21. In a step S23, it is determined whether or not the face recognition is successful, that is, whether or not the face portion FC exists in the object scene. Herein, when YES is determined, the process proceeds to a step S25 in which the rectangular imaging area M1 covering the outline of the face portion FC is designated as a focal-point search area. In a step S27, an outer-periphery-area excluding process is executed, and therefore, the rectangular imaging area M2 narrower than the imaging area M1 is designated as the frequency-component detection area. On the other hand, when NO is determined in the step S23, the process proceeds to a step S29 in which the entire region of the focus area FA is designated as the frequency-component detection area and the focal-point search area.

In a step S31, the high-frequency AF evaluation values detected in the frequency-component detection area are fetched from the AF evaluation circuit 32, and the total sum (=ΣAFh) of the fetched high-frequency AF evaluation values is calculated. In a step S33, the mid-frequency AF evaluation values detected in the frequency-component detection area are fetched from the AF evaluation circuit 34, and the total sum (=ΣAFm) of the fetched mid-frequency AF evaluation values is calculated. In a step S35, a calculation according to the above-described Equation 1 is executed in order to calculate the relative ratio of the calculated total sums ΣAFh and ΣAFm.

In a step S37, it is determined whether or not the calculated relative ratio is equal to or less than the threshold value TH, and when YES is determined, the process proceeds to a step S51 via processes in steps S39 to S43, whereas, when NO is determined, the process proceeds to the step S51 via processes in steps S45 to S49. In the step S39, the entire region of the range over which the focus lens 12 is able to move is designated as the moving range; in the step S41, the nearest-side end portion of the designated moving range is designated as the movement start position; and in the step S43, the infinite direction is designated as the moving direction. In the step S45, a partial range including the current position of the focus lens 12 out of the range over which the focus lens 12 is able to move is designated as the moving range; in the step S47, the infinite-side end portion of the designated moving range is designated as the movement start position; and in the step S49, the nearest direction is designated as the moving direction.

In the step S51, the hill-climbing AF process is executed in order to search the focal point. When the processes in the steps S39 to S43 are executed, the focus lens 12 starts moving toward the infinite side from the nearest-side end portion of the movable range, and is arranged at the focal point of a subject nearest the imaging surface. On the other hand, when the processes in the steps S45 to S49 are executed, the focus lens 12 starts moving toward the nearest side from a position that is closer to the infinite side from the current position and is near the current position, and is arranged at the focal point detected near the current position. Upon completion of the process in the step S51, the process is restored to a routine at a hierarchical upper level.

Figure 10:
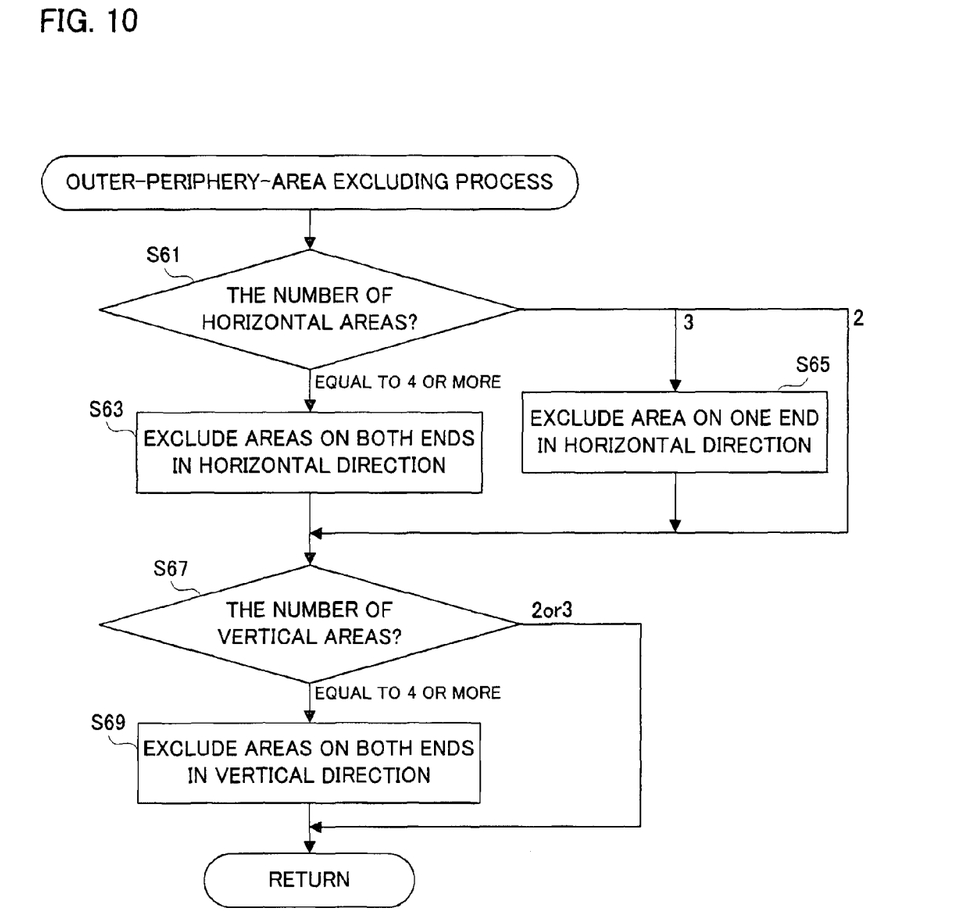
FIG. 10 is a flowchart showing yet still another portion of the operation of the CPU applied to the embodiment in FIG. 1.

The outer-periphery-area excluding process in the step S27 shown in FIG. 8 is executed according to a subroutine shown in FIG. 10. First, the number of evaluation areas in the horizontal direction forming the focal-point search area designated in the step S25 in FIG. 8 is determined in a step S61. When the number of horizontal areas is equal to or more than four, the process proceeds to a step S63 in which two evaluation areas respectively positioned on both ends in the horizontal direction are excluded. When the number of horizontal areas is three, the process proceeds to a step S65 in which one evaluation area positioned on one end in the horizontal direction is excluded. Upon completion of the process in the step S63 or S65, the process proceeds to a step S67. It is noted that when the number of horizontal areas is two, the process directly proceeds to a step S67.

In the step S67, the number of evaluation areas in the vertical direction forming the focal-point search area designated in the step S25 in FIG. 8 is determined. When the number of vertical areas is equal to or more than four, the process proceeds to a step S69 in which two evaluation areas respectively positioned on both ends in the vertical direction are excluded. Upon completion of the excluding process, the process is restored to a routine at a hierarchical upper level. When the number of vertical areas is less than four, the process is directly restored to the routine at a hierarchical upper level. The frequency-component detection area is formed of evaluation areas that are not subjected to the excluding process in the steps S63, S65, and S69.

As is apparent from the above descriptions, the image sensor 18 has the imaging surface for capturing the object scene through the focus lens 12 and repeatedly generates the object scene image. When the object scene captured by the imaging surface includes the face portion FC (specific object) of a human, the CPU 50 designates, as the focal-point search area, on the imaging surface, the imaging area M1 in which the face portion FC is captured so as to cover the outline of the face portion FC (S25). The CPU 50 also designates, on the imaging surface as the frequency-component detection area, the imaging area M2 that is smaller than the imaging area M1 and captures the inner side of the outline of the face portion FC (S27).

Subsequently, the CPU 50 obtains the high-frequency AF evaluation value (a high-frequency component) and the mid-frequency AF evaluation value (a mid-frequency component)

respectively detected in the AF evaluation circuits 32 and 34 corresponding to the frequency-component detection area (S31 and S33), and designates, as the moving range (a distance change range) of the focus range 12, a range different depending upon the relative ratio (a quantitative difference of the two frequency components) of the obtained high-frequency AF evaluation value and mid-frequency AF evaluation value (S37, S39, and S45). Thereafter, the CPU 50 changes the position of the focus lens 12 within the designated moving range and references a partial image generated by the image sensor 18 corresponding to the focal-point search area so as to search the focal point with respect to the face portion FC (S51).

As described above, when the object scene includes the face portion FC, the focal point with resect to the face portion FC is specified by referencing a partial image that corresponds to the imaging area M1. Also, the high-frequency AF evaluation value and the mid-frequency AF evaluation value are obtained from a partial image that corresponds to the imaging area M2. Herein, the imaging area M1 is an area for capturing the face portion FC so as to cover the outline of the face portion FC, and the imaging area M2 is an area that is smaller than the imaging area M1 and captures the inner side of the outline of the face portion FC.

As a result, the relative ratio of the high-frequency AF evaluation value and the mid-frequency AF evaluation value detected corresponding to the imaging area M2 precisely reflects the focusing degree with respect to the face portion FC. When a range different depending upon the relative ratio is designed as the moving range of the focus lens 12, it becomes possible to shorten a time period required for searching a focal point. Also, the partial image within the imaging area M1, referenced for specifying the focal point with respect to the face portion FC, includes many frequency components required for searching the focal point. Thereby, it is possible to precisely specify the focal point.

It is noted that in this embodiment, when the focus adjusting process is performed, the focus lens 12 is moved in the optical axis direction. However, together with the focus lens 12 or instead of the focus lens 12, the imaging portion 20 may be moved in the optical axis direction. Further, the image sensor 12 in this embodiment is a CMOS type. However, instead thereof, a CCD-type image sensor may be adopted.

Although the present invention has been described and illustrated in detail, it is clearly understood the same is by way of illustration and example only and is not to be taken by way of limitation, the spirit and scope of the present invention being limited only by the terms of the appended claims.

What is claimed is:

1. An electronic camera comprising:
an imager, having an imaging surface for capturing an object scene though an optical lens, which repeatedly generates an object scene image;
a first area designator which designates on said imaging surface, as a focal-point search area, a first imaging area for capturing a specific object so as to cover an outline of said specific object when the object scene captured by said imaging surface includes said specific object;
a second area designator which designates on said imaging surface, as a frequency-component detection area, a second imaging area that is smaller than said first imaging area and is for capturing an inner side of the outline of said specific object;
a detector which detects a plurality of frequency components respectively corresponding to a plurality of frequency bands, from a partial image generated by said imager in a manner to correspond to said frequency-component detection area;
a range designator which designates, as a distance change range, a range different depending upon a quantitative difference among the plurality of frequency components detected by said detector; and
a searcher which searches a focal point for said specific object, by changing a distance from said optical lens to said imaging surface in said distance change range and referencing a partial image generated by said imager in a manner to correspond to said focal-point search area,
wherein said range designator includes a first range designator which designates, as said distance change range, a first range that may include the focal point for said specific object, when said quantitative difference exceeds a reference, and a second range designator which designates, as said distance change range, a second range that includes a current distance from said optical lens to said imaging surface and is narrower than said first range, when said quantitative difference is equal to or less than the reference, further comprising:
a first distance designator which designates, as a change start distance, a longest distance within said distance change range in association with a designating process of said first range designator; and
a second distance designator which designates, as the change start distance, a shortest distance within said distance change range in association with a designating process of said second range designator, wherein said searcher starts a change process from said change start distance.

2. An electronic camera, comprising:
an imager, having an imaging surface for capturing a scene through an optical lens, which repeatedly outputs a scene image;
a first area designator which designates on said imaging surface a first area for capturing a specific object that is detected from the scene;
a second area designator which designates on said imaging surface a second area that is smaller than the first area designated by said first area designator and is for capturing the specific object noticed by said first area designator;
a range designator which designates a focal point searching range in a manner that is different depending upon a magnitude of a high frequency component contained in a partial image outputted from said imager corresponding to the second area designated by said second area designator;
a changer which changes a distance from said optical lens to said imaging surface in the focal point searching area designated by said range designator; and
a searcher which executes a process of searching a focal point based on a partial image outputted from said imager corresponding to the first area designated by said first area designator, in parallel with a changing process of said changer.

3. An electronic camera according to claim 2, wherein in at least one of a horizontal direction and a vertical direction, a size of the first area is larger than a size of an object image representing the specific object, and a size of the second area is smaller than the size of the object image representing the specific object.

4. An electronic camera according to claim 2, wherein said range designator includes a detector which detects a plurality of frequency components respectively corresponding to a plurality of frequency bands, a calculator which calculates a magnitude of a quantitative difference among the plurality of frequency components detected by said detector, and a determiner which determines the focal point searching range in reference to the magnitude calculated by said calculator.

5. An electronic Camera according to claim 4, wherein said determiner includes a first range determiner which determines, as the focal point searching range, a first range that may include the focal point when the magnitude exceeds a reference, and a second determiner which determines as the focal point searching range, a second range that is larger than the first range when the magnitude is equal or less than the reference.

6. An electronic camera according to claim 5, further comprising:
   a first end designator which designates one end of the first range as a starting end in association with a determining process of the first range determiner; and
   a second end designator which designates the other end of the second range as the starting end in association with a determining process of the second range determiner, wherein said changer starts changing from the starting end.

7. An electronic camera according to claim 2, wherein the second area is equivalent to an area in which a horizontal size of the first area is reduced in preference to a vertical size of the first area.

8. An electronic camera according to claim 2, wherein the specific object is equivalent to a face portion of a human.

9. A computer program embodied in a tangible medium, which is executed by a processor of an electronic camera provided with an imager, having an imaging surface for capturing a scene through an optical lens, which repeatedly outputs a scene image, the computer program, comprising:
   a first area designating instruction to designate on said imaging surface a first area for capturing a specific object that is detected from the scene;
   a second area designating instruction to designate on said imaging surface a second area that is smaller than the first area designated by said first area designating instruction and is for capturing the specific object noticed by said first area designating instruction;
   a range designating instruction to designate a focal point searching range in a manner that is different depending upon a magnitude of a high frequency component contained in a partial image outputted from said imager corresponding to the second area designated by said second area designating instruction;
   a changing instruction to change a distance from said optical lens to said imaging surface in the focal point searching area designated by said range designating instruction; and
   a searching instruction to execute a process of searching a focal point based on a partial image outputted from said imager corresponding to the first area designated by said first area designating instruction, in parallel with a changing process based on said changing instruction.

10. An imaging control method which is executed by an electronic camera provided with an imager, having an imaging surface for capturing a scene through an optical lens, which repeatedly outputs a scene image, the imaging control method, comprising:
    a first area designating step of designating on said imaging surface a first area for capturing a specific object that is detected from the scene;
    a second area designating step of designating on said imaging surface a second area that is smaller than the first area designated by said first area designating step and is for capturing the specific object noticed by said first area designating step;
    a range designating step of designating a focal point searching range in a manner that is different depending upon a magnitude of a high frequency component contained in a partial image outputted from said imager corresponding to the second area designated by said second area designating step;
    a changing step of changing a distance from said optical lens to said imaging surface in the focal point searching area designated by said range designating step; and
    a searching step of executing a process of searching a focal point based on a partial image outputted from said imager corresponding to the first area designated by said first area designating step, in parallel with a changing process of said changing step.

* * * * *